(12) United States Patent
Wake (10) Patent No.: US 6,186,298 B1
(45) Date of Patent: Feb. 13, 2001

(54) ONE-WAY CLUTCH HAVING LOCK-UP FUNCTION

(75) Inventor: Masato Wake, Lombard, IL (US)

(73) Assignee: NSK-Warner K.K., Tokyo (JP)

( * ) Notice: Under 35 U.S.C. 154(b), the term of this patent shall be extended for 0 days.

(21) Appl. No.: 09/350,130

(22) Filed: Jul. 9, 1999

(30) Foreign Application Priority Data

Jul. 10, 1998 (JP) .................................................. 10-195421

(51) Int. Cl.$^7$ .................................................. F16D 41/066
(52) U.S. Cl. .......................... 192/38; 192/45; 192/85 AT
(58) Field of Search ............... 192/44, 47, 88 B, 192/85 AT, 45, 38; 188/82.3, 82.84

(56) References Cited

U.S. PATENT DOCUMENTS

| | | | |
|---|---|---|---|
| 1,152,075 | * | 8/1915 | Buschmann ........................ 192/44 X |
| 1,735,125 | * | 11/1929 | Miller ...................................... 192/47 |
| 1,760,709 | * | 5/1930 | Miller ...................................... 192/47 |
| 2,989,160 | * | 6/1961 | Woodruff ............................ 192/38 X |
| 3,054,488 | * | 9/1962 | General et al. ......................... 192/44 |
| 3,084,774 | * | 4/1963 | Liang ....................................... 192/44 |
| 3,134,471 | * | 5/1964 | Croswhite .............................. 192/44 |
| 3,279,571 | * | 10/1966 | Wassilieff .............................. 192/38 |
| 3,737,014 | * | 6/1973 | Dalrymple ......................... 192/38 X |
| 5,152,726 | * | 10/1992 | Lederman ..................... 188/82.84 X |
| 5,638,929 | * | 6/1997 | Park ....................................... 192/44 |
| 6,068,097 | * | 5/2000 | Kurita ................................ 192/38 X |

* cited by examiner

Primary Examiner—Rodney H. Bonck
(74) Attorney, Agent, or Firm—Vorys, Sater, Seymour and Pease LLP (57) ABSTRACT

A one-way clutch having a lock-up function, comprises an outer race, an inner race radially spaced apart from the outer race and disposed within the outer race concentrically for relative rotation, a cam surface provided on an inner peripheral surface of the outer race or an outer peipheral surface of the inner race, a track surface provided on the outer peripheral surface of the inner race or the inner peripheral surface of the outer race in a confronting relationship to the cam surface, a plurality of roller members disposed between the outer race and the inner race and adapted to transmit torque between the outer race and the inner race, springs for biasing the roller members toward one circumferential direction, a side plate for holding the roller members and the springs with predetermined intervals along a circumferential direction, and a control member for acting on the roller members to effect lock-up control, and wherein the control member controls the one-way clutch to lock up the one-way clutch in both directions or one direction by urging the roller members radially against the outer peripheral surface of the inner race or the inner peripheral surface of the outer race to frictionally engage the former with the latter or by releasing the roller members.

18 Claims, 13 Drawing Sheets

ONE-WAY CLUTCH HAVING LOCK-UP FUNCTION

BACKGROUND OF THE INVENTION

1. Field of the Invention

The present invention relates to an improvement in a one-way clutch used in a transmission, particularly an automatic transmission of a motor vehicle, an agricultural machine, a construction machine, an industrial machine and the like. More particularly, the present invention relates to a one-way clutch having a lock-up function.

2. Related Background Art

A conventional one-way clutch used in an automatic transmission has an outer race and an inner race which are rotated relative to each other, and sprags or rollers for transmitting torque between the outer race and the inner race are engaged by a cam surface provided on a track surface of the outer race or the inner race, thereby transmitting rotational torque only in one direction. Further, such a one-way clutch is idly rotated in reverse direction.

Such a one-way clutch cannot be used in case that rotation must be transmitted in both of two directions. In such cases, by combining the one-way clutch with a multi plate clutch such as a multi-plate frictional engaging device for effecting lock-up, a clutch is designed so that a rotary member is idly rotated only in one direction or the rotary member is prevented from being idly rotated in both of two directions, on demand.

However, in such an arrangement, the function for effecting idle rotation only in one direction and the function for preventing idle rotation in both directions must be shared with two members, with the result that there arise problems such as an increase in the number of parts, complexity, bulkiness, an increase in weight and an increase in cost.

SUMMARY OF THE INVENTION

Accordingly, an object of the present invention is to provide a one-way clutch having a lock-up function, which has both a function for effecting idle rotation only in one direction and a function for preventing rotation in both directions, in order to solve problems such as an increase in the number of parts, complexity, bulkiness, an increase in weight and an increase in cost.

To achieve the above object, the present invention provides a one-way clutch having a lock-up function, comprising an outer race, an inner race radially spaced apart from the outer race and disposed within the outer race concentrically for relative rotation, a cam surface provided on an inner peripheral surface of the outer race or an outer peripheral surface of the inner race, a track surface provided on the outer peripheral surface of the inner race or the inner peripheral surface of the outer race in a confronting relationship to the cam surface, a plurality of roller members disposed between the outer race and the inner race and adapted to transmit torque between the outer race and the inner race, springs for biasing the roller members toward one circumferential direction, a side plate for holding the roller members and the springs at predetermined intervals along a circumferential direction, and a control member for acting on the roller members to effect lock-up control, and wherein the control member controls the one-way clutch to lock-up the one-way clutch in both directions or one direction by urging the roller members radially against the outer peripheral surface of the inner race or the inner peripheral surface of the outer race to frictionally engage the former with the latter or by releasing the roller members.

According to the present invention, when a torque transmitting member normally fixed or secured only in one direction is urged against the inner race, a friction force is generated at a contact area between the torque transmitting member and the inner race, with the result that the torque transmitting member follows the rotational direction of the inner race regardless of the urging force of the spring, thereby locking-up the one-way clutch.

DESCRIPTION OF THE PREFERRED EMBODIMENTS

The present invention will now be fully explained in connection with embodiments thereof with reference to the accompanying drawings. Incidentally, it should be noted that embodiments described hereinbelow are explained only as examples of the present invention and do not limit the present invention. Further, in the drawings, the same elements are designated by the same reference numerals.

(Operating Principle)

Before explaining embodiments, a principle of the present invention will be described with reference to FIG. 1. A conventional one-way clutch has only a single cam surface by which rollers as torque transmitting members are engaged. However, in the present invention, there are provided symmetrical (in a left-and-right direction) cam surfaces 101, 102. Each of substantially cylindrical roller members or rollers 140 is always biased toward the left cam surface 101 by a corresponding spring 103 having one end held by a spring holding member 104.

An urging member or urging plate 150 is disposed above the roller 140. Normally, the urging plate 150 is in an elevated position not in contact with the roller 140, or no external force acts on the urging plate 150 so that, if the urging plate is contacting with the roller 140, movement of the roller 140 is not obstructed.

Figure 1:
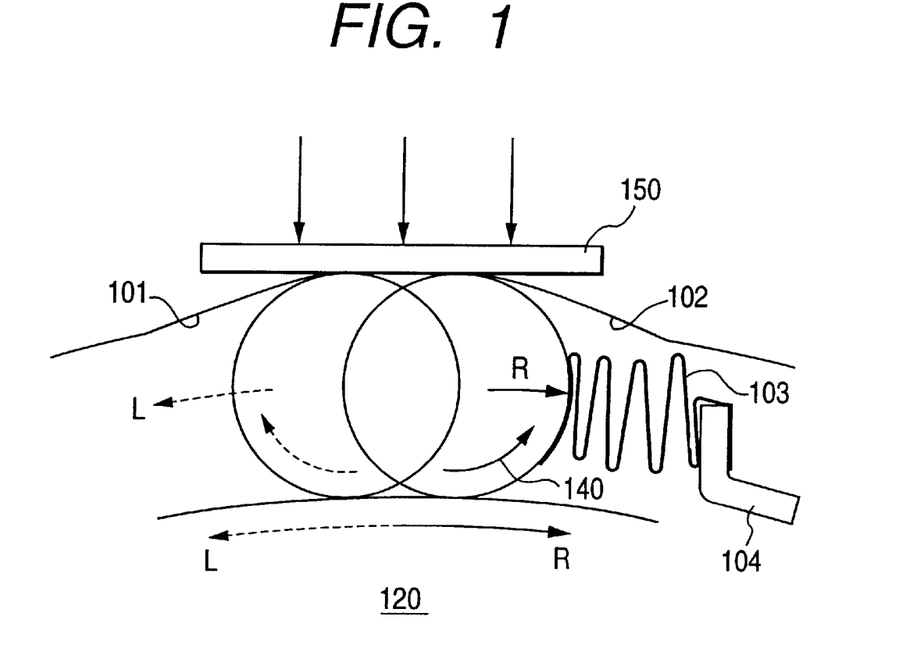
FIG. 1 is a view for explaining an operating principle of the present invention.

In a condition that the urging plate 150 is in the elevated position, when an inner race 120 rotates in an anti-clockwise direction, i.e., a left direction L in FIG. 1, the roller 140 is pushed by the spring to engage with the left cam surface 101, thereby securing the inner race 120. On the other hand, when rotated in a clockwise direction, i.e., a right direction R, the inner race 120 can idly be rotated.

When the urging plate 150 is lowered, the roller 140 is urged against the inner race 120, thereby generating a friction force in a contact area between the roller and the inner race. This friction force causes the roller 140 to follow the rotation of the inner race 120. When the inner race 120 is rotated in the left direction L, the roller 140 is engaged by the left cam surface 101. When rotated in the right direction R, the friction force between the roller 140 and the inner race shifts the roller 140 in the right direction in opposition to a biasing force of the spring, thereby eventually engaging the roller with the right cam surface 102. Thus, depending upon the operation of the urging plate 150, the inner race 120 is locked-up (secured) in both directions or in one direction.

(First Embodiment)

Figure 2:
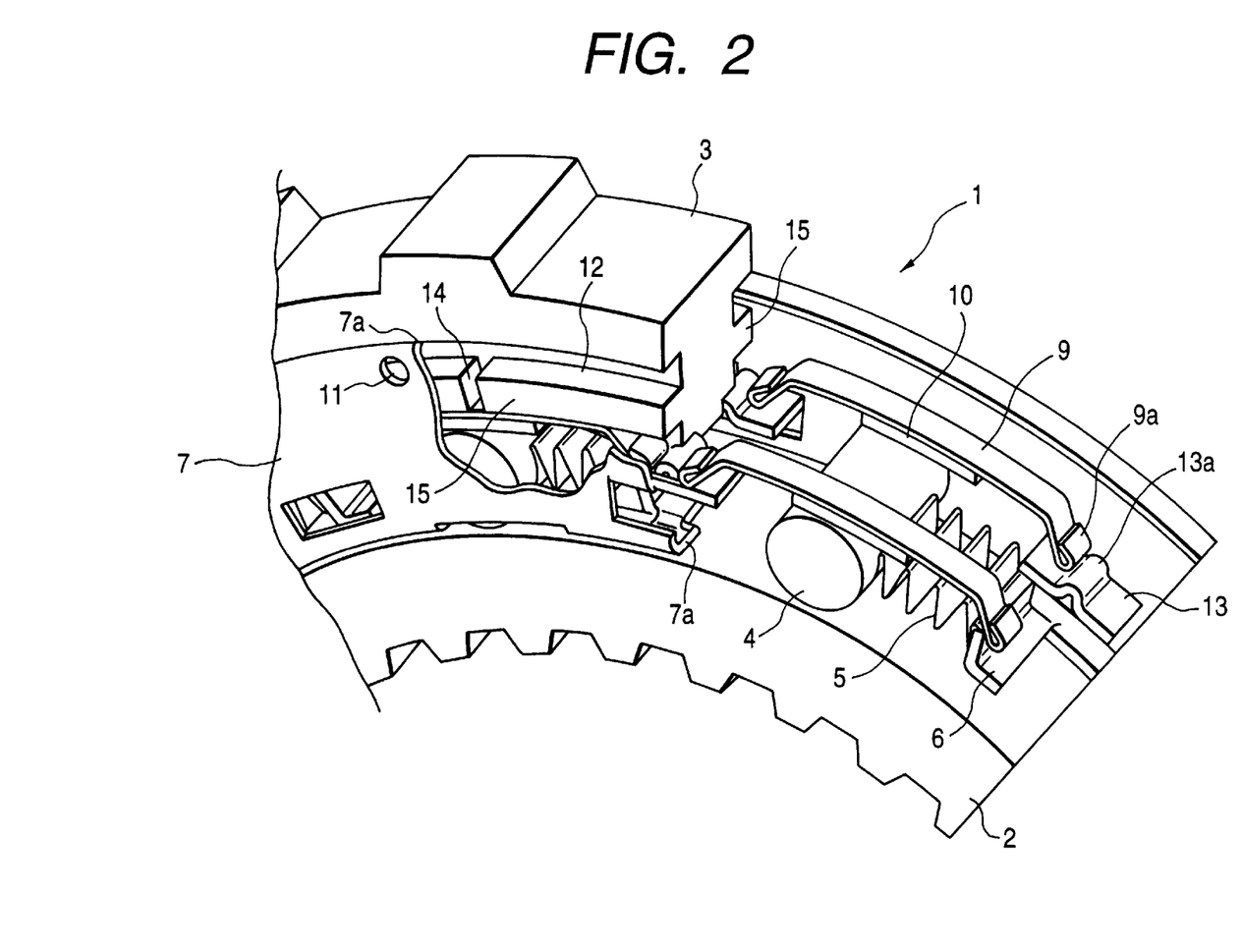
FIG. 2 is an exploded perspective view of a one-way clutch according to a first embodiment of the present invention.

FIG. 2 is an exploded perspective view of a one-way clutch having a lock-up function (referred to merely as "one-way clutch" hereinafter) according a first embodiment of the present invention. A one-way clutch 1 has an inner race 2, and an outer race 3 capable of being rotated relatively and coaxially disposed radially outwardly of the inner race 2. Incidentally, in various embodiments (described later) including the first embodiment, the outer race is non-driven. Only the inner race is driven.

Annular side plates 7 are disposed between the outer race 3 and the inner race 2, and oil pressure introduction ports 11 for introducing oil pressure supplied from an oil-hydraulic circuit (not shown) are formed in the side plates 7. Further, annular oil passages 12 are formed in the outer race 3 at both axial sides.

The oil pressure introduced into the oil passages 12 is transmitted through a plurality of radial through holes 14 formed in partition walls 15 at predetermined positions, thereby urging the urging members 9 which will be described later.

As can be seen from FIG. 2, two urging members are arranged side by side in an axial direction to urge both axial ends of a corresponding roller.

Figure 3:
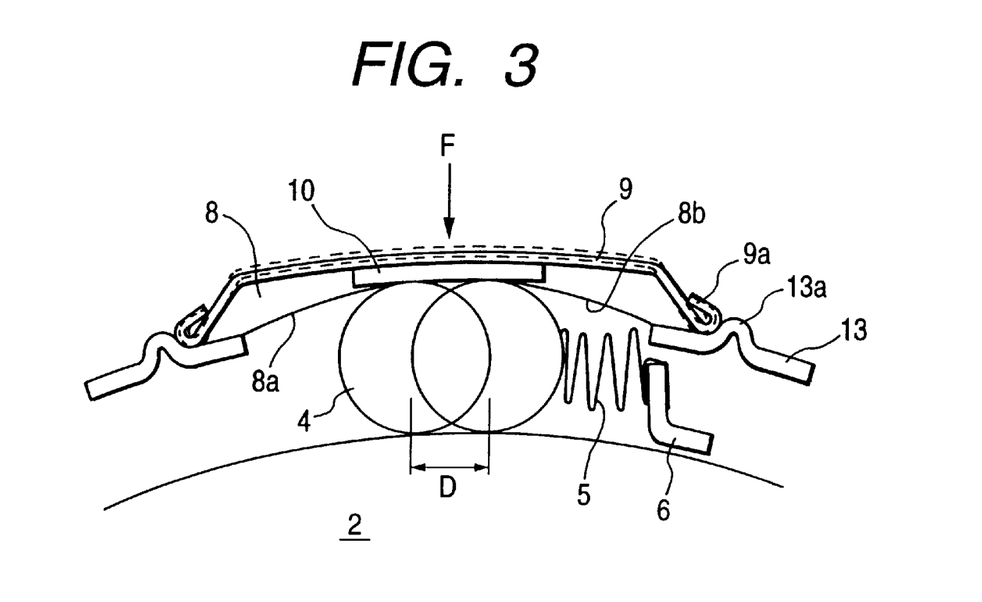
FIG. 3 is a partial radial sectional view of the one-way clutch according to the first embodiment of the present invention.

FIG. 3 is a partial axial sectional view of the one-way clutch 1 of FIG. 2. As shown in FIG. 3, a cam portion 8 is provided on a portion of the inner peripheral surface of the outer race 3 radially inwardly of the oil passages 12 and has pairs of opposed cam surfaces 8a, 8b having substantially equal but opposite inclinations. The pairs of the cam surfaces 8a, 8b are equidistantly spaced apart from the adjacent pair along the circumferential direction.

A plurality of rollers 4 corresponding to the pairs of cam surface 8a, 8b are disposed between the cam portion 8 and the outer peripheral surface of the inner race 2. Each roller 4 has a substantially cylindrical shape and is rotatable along the circumferential direction. The rollers 4 are held by the side plates 7 so as not to be dislodged in the axial direction.

The rollers 4 are biased toward one direction, i.e., toward the respective cam surfaces 8a by corresponding springs 5 such as accordion springs. The springs 5 have one end secured by fixed plates 6 integrally protruded from a cage.

Urging members 9 comprised of spring members having predetermined elasticity are disposed between corresponding rollers 4 and the partition walls 15. The urging members serving as urging plates of the lock-up mechanism of the one-way clutch 1 are arranged to straddle the single roller 4. Accordingly in correspondence to the number of rollers 4, a plurality of urging members 9 are provided along the circumferential direction.

A friction material 10 is adhered, by an adhesive, to an inner surface of each urging member 9, i.e., surface facing the corresponding roller 4 in order to easily obtain a friction force. However, if a sufficient friction force can be by direct contact with the inner surface, the friction material need not be provided. Both circumferential ends 9a of each urging member 9 are bent outwardly so that the ends 9a are supported by holding projections 13 integrally protruding from the corresponding side plate 7 not to be overlapped with the ends of the adjacent urging member. Each holding projection 13 has a central curved portion 13a curved upwardly. The end 9a of the urging member 9 is prevented from being contacted with the end 9a of the adjacent urging member 9 by this curved portion 13a. As a result, when the urging member 9 as a control member for effecting lock-up is displaced downwardly, since both circumferential ends of the urging member 9 are held by the holding projections 13, excessive deformation of the urging member 9 can be prevented.

In the one-way clutch having such a construction, each urging member 9 is operated as follows. First, the oil pressure F introduced from the oil pressure introduction port 11 is transmitted to a rear surface of the urging member 9 through the oil passage 12 and the through hole 14 to flex the urging member 9, thereby urging the urging member toward the inner race 2. In this case, the holding projections 13 act as fulcrums when the urging member 9 is flexed. As a result, the urging member 9 urges the corresponding roller 4 against the outer peripheral surface of the inner race 2 via the friction material 10. This condition is shown by the solid line in FIG. 3. With dependence upon the rotational direction of the inner race 2, the roller 4 is engaged by the cam surface 8a or the cam surface 8b thereby locking-up the one-way clutch.

On the other hand, in order to release the lock-up by stopping the operation of the urging member 9, the oil pressure may merely be released. When the oil pressure is released, each urging member is lifted up to its original position by its own elastic force. This condition of the urging member 9 is shown by the broken line in FIG. 3. In the condition that the oil pressure is being applied, the force of the oil pressure is greater than the elastic force of the urging member 9.

As shown in FIG. 3, each roller 4 can be shifted between the cam surface 8a and the cam surface 8b by a distance D between two lock positions. In the actual operation of the one-way clutch 1, all of the rollers 4 are urged by the urging members 9 substantially simultaneously. However, a plurality of oil passages may be provided as independent units so that only some rollers 4 can be urged.

Figure 4:
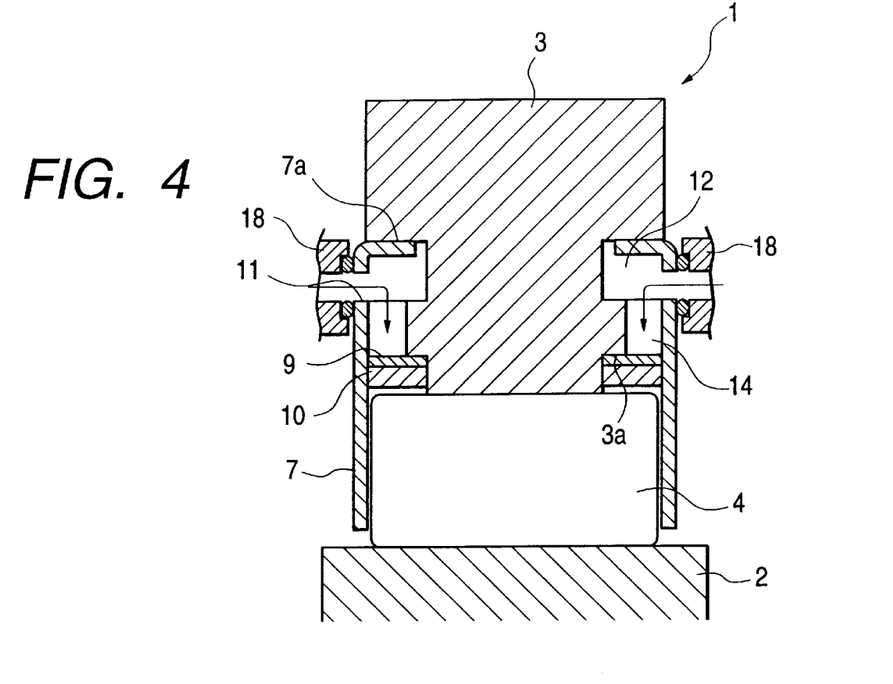
FIG. 4 is an axial sectional view showing an example of an oil path arrangement useful in various embodiments of the present invention.

Now, a relationship between the oil pressure and the urging member 9 will be described with reference to FIG. 4. FIG. 4 is an axial sectional view of the one-way clutch 1 according to the first embodiment.

In FIG. 4, the annular side plates 7 are fitted into both axial sides of the one-way clutch 1 to keep the oil passages 12 of the outer race 3 in a liquid-tight condition. Since each side plate 7 is slidingly contacted with the inner peripheral surface of the outer race 3 and the outer peripheral surface of the inner race 2 and is provided at both its radial ends with annular flanges 7a extending axially inwardly (see FIG. 2), the side plate 7 has a function as an end bearing to maintain concentricity between the outer race 3 and the inner race 2. Incidentally, upper flanges 7a of the side plates 7 are fitted into the oil passages 12.

The oil introduction ports 11 formed in the two side plates 7 provided on both axial sides of the clutch are connected to oil tubes 18 connected to an oil hydraulic circuit (not shown). The oil entered into the oil passage 12 from the corresponding oil tube 18 and oil introduction port 11 passes through the through hole 14 and acts on the rear surface of the urging member 9 to urge the urging member downwardly. It is designed so that the pressure is held while retaining a very small gap or clearance defined by a stepped portion 3a of the outer race 3, side plate 7, urging member 9 and allowing movement of the urging member 9. An oil seal is provided between the oil tube 18 and the oil introduction port 11 to seal the boundary between them. The urging member 9 and the friction material 10 can be displaced between the surface of the roller 4 and the stepped portion 3a of the outer race 3.

Incidentally, FIG. 4 shows a condition that the oil pressure is not applied.

In the above explanation, while an example that the urging members 9 as the urging plates are installed in both axial side grooves of the outer race 3 was explained, so long as the roller 4 is not inclined (for example, when a diameter of the roller is considerably greater than the width of the roller), the urging member may be installed only at one axial side of the outer race. Further, it should be understood that the oil passage arrangement shown in FIG. 4 can be applied to various embodiments which will be described later.

(Other Examples of Oil Passage Arrangement)

Figure 5:
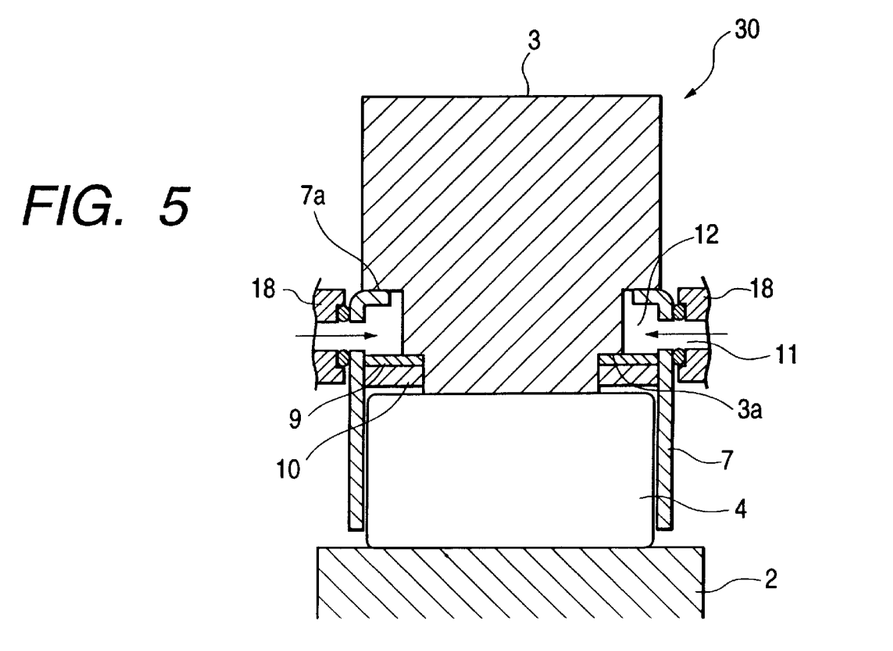
FIG. 5 is an axial sectional view showing another example of an oil path arrangement useful in various embodiments of the present invention.

FIG. 5 is a sectional view similar to FIG. 4. Although the fundamental arrangement is the same as that shown in FIG. 4, there are no through holes 14 in FIG. 5. Accordingly, the oil introduced from each oil introduction port 11 of the side plate 7 enters into the oil passage 12 and provides the oil pressure required for urging the urging member 9 against the roller 4. According to an example shown in FIG. 5, since the oil paths are reduced, the construction is made simpler.

Figure 6:
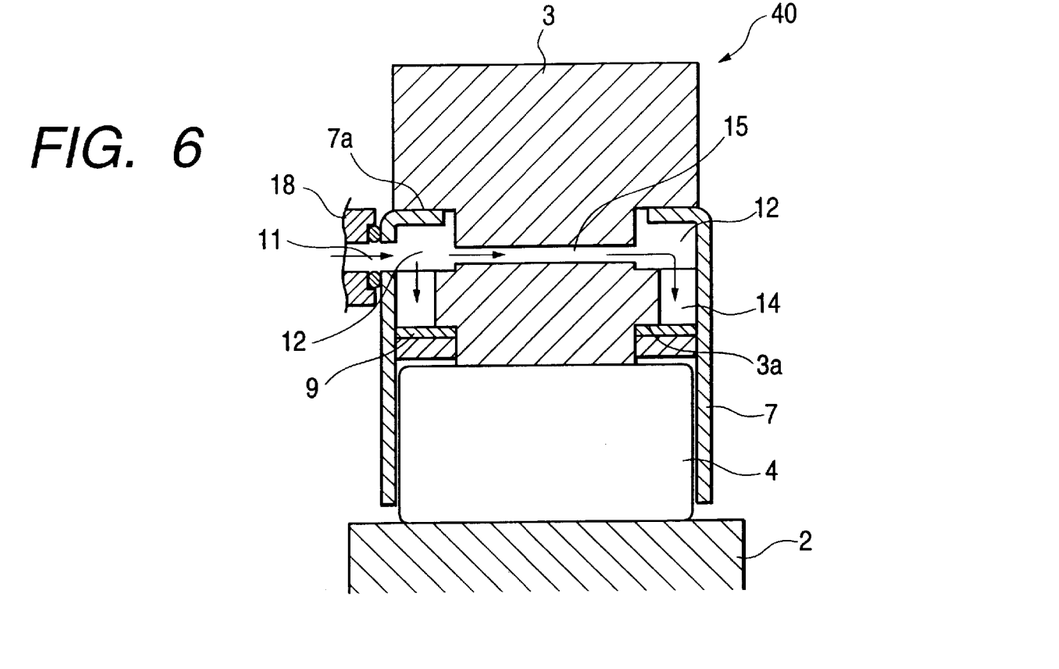
FIG. 6 is an axial sectional view showing a further example of an oil path arrangement useful in various embodiments of the present invention.

FIG. 6 is a sectional view similar to FIG. 4. In this example, oil passages of the outer race 3 differ from those in FIG. 4.

In FIG. 6, annular side plates 7 are fitted into both axial sides of a one-way clutch 40 to keep oil passages 12 of an outer race 3 in a liquid-tight condition. Similar to FIG. 4, each side plate 7 has a function as an end bearing to prevent a roller 4 from dislodging in the axial direction and to maintain concentricity between the outer race 3 and the inner race 2.

The two oil passages 12 provided in the outer race 3 at its axial sides communicate with each other through a communication passage 15. Accordingly, the oil tube 18 and the oil introduction port 11 may be provided for only one of the side plates 7.

The oil entering into the oil passage 12 from the oil introduction port 11 formed in the side plate 7 also enters into the opposite oil passage 12 and applies predetermined pressure onto the urging members 9 through the through holes 14.

FIG. 6 shows a condition where the oil pressure is not applied. Incidentally, as mentioned above, in the example shown in FIG. 6, two oil passages 12 provided at both axial sides are communicated with each other through the communication passage 15 extending axially through the outer race. At least one communication passage 15 is provided in the circumferential direction of the outer race 3. The oil pressure in the oil passages 12 is made uniform by the presence of the communication passages 15, thereby applying substantially uniform hydraulic forces to the urging members 9. According to the example of the oil passage arrangement shown in FIG. 6, since the oil tube 18 and the oil introduction port 11 may be provided only at one side, the arrangement is made simpler.

Figure 7:
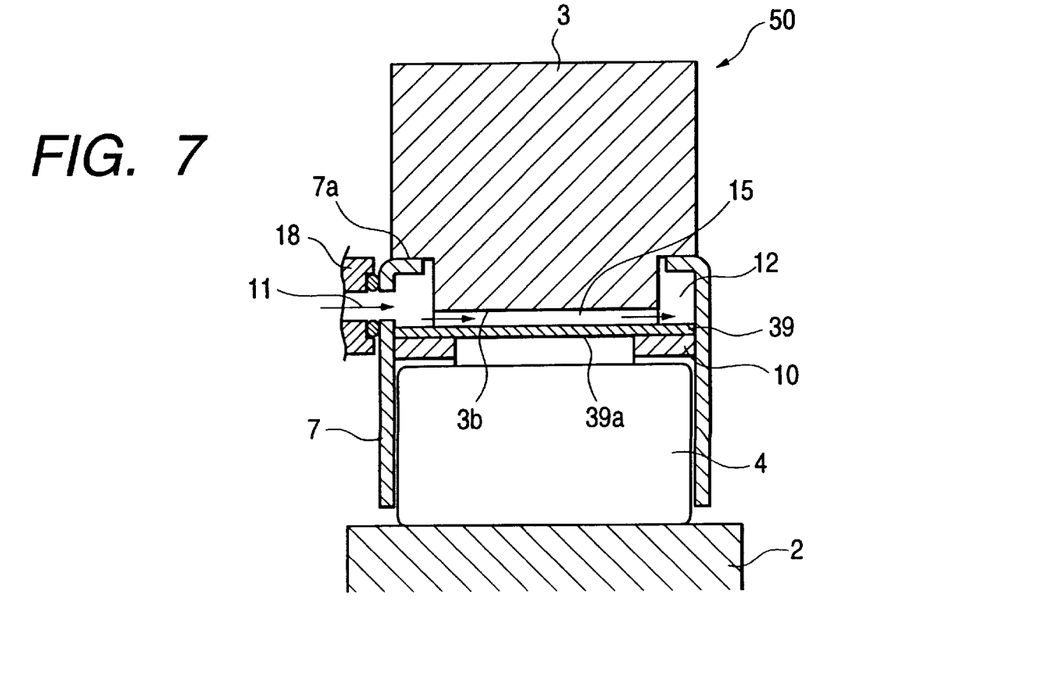
FIG. 7 is an axial sectional view showing a still further example of an oil path arrangement useful in various embodiments of the present invention.

FIG. 7 is a sectional view similar to FIG. 5. In this example, an oil passage arrangement of the outer race 3 differs from those in FIGS. 4 to 6 the constructions of urging members 39 also differ. Also in a one-way clutch 50 shown in FIG. 7, each side plate 7 has a function as an end bearing.

In the example shown in FIG. 7, similar to FIG. 6, two oil passages 12 provided at both axial sides communicate with each other by a communication passage 15 extending axially through the outer race. At least one communication passage 15 is provided in the circumferential direction of the outer race 3. The oil pressure in the oil passages 12 is made uniform by the presence of the communication passage 15, thereby applying substantially uniform hydraulic forces to the urging members 9.

Figure 18:
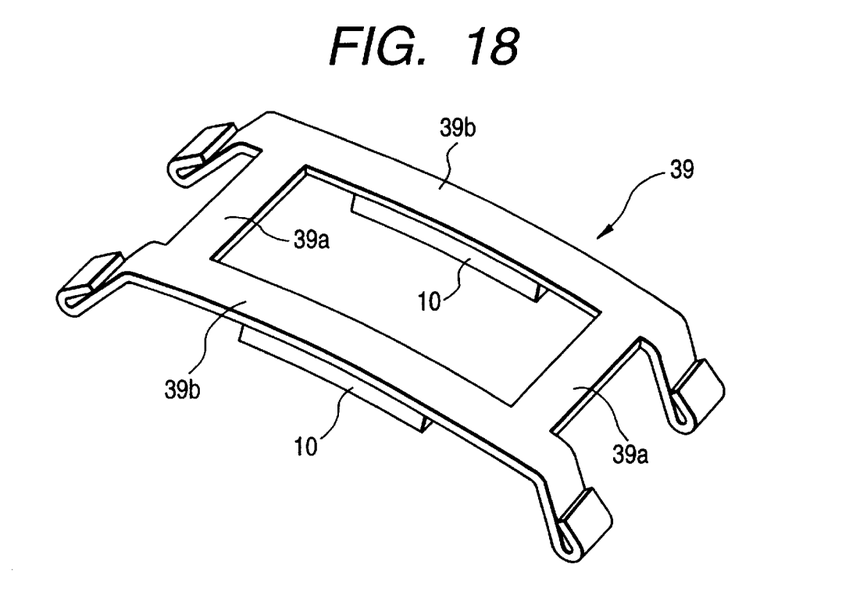
FIG. 18 is a perspective view showing an urging member of FIG. 7 in detail.

In the example shown in FIG. 7, unlike the aforementioned embodiments in which two urging members are arranged independently in the axial direction, each urging member 39 is constituted by interconnecting two urging portions 39b via connecting portions 39a, as shown in FIG. 18. According to the example of the oil passage arrangement shown in FIG. 7, similar to the example of FIG. 6, since the oil tube 18 and the oil introduction port 11 may be provided only at one side, the arrangement is made simpler. Further, an urging force for the urging member 39 acts on the integrally formed urging member 39 uniformly. Particularly, since the hydraulic force is distributed via the connecting portions 39a, the urging force of the urging portions 39b against the roller 4 becomes uniform and synchronism can be achieved.

Incidentally, the arrows shown in FIGS. 4 to 7 indicate flows of oil introduced from the oil introduction ports.

(Second Embodiment)

Figure 8:
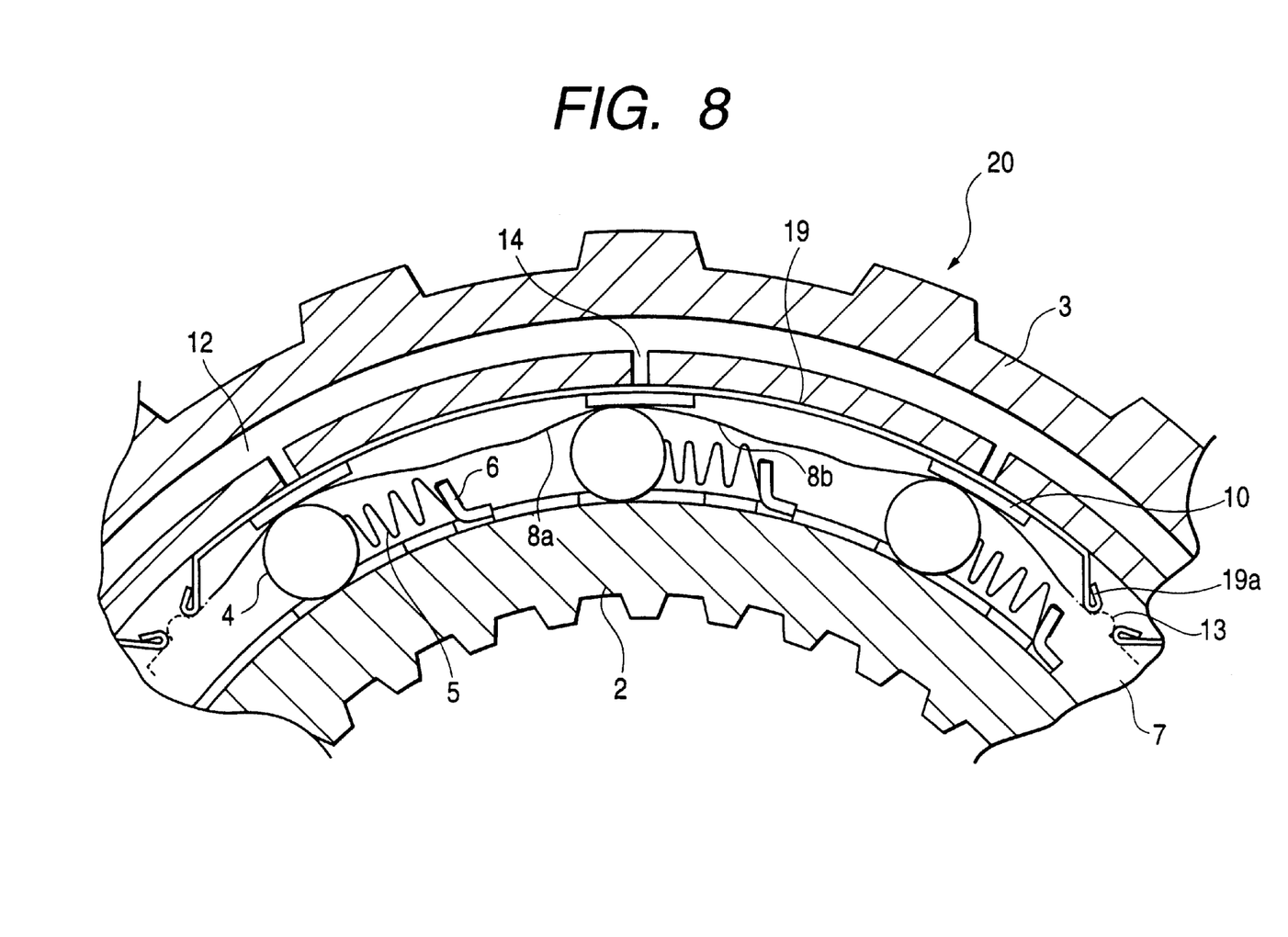
FIG. 8 is a partial radial sectional view of a one-way clutch according to a second embodiment of the present invention.

FIG. 8 is a partial radial sectional view of a one-way clutch 20 according to a second embodiment of the present invention. Since fundamental construction and operation are the same as those of the first embodiment, explanation thereof will be omitted.

In the second embodiment, unlike the first embodiment, the design is such that one elongated urging member 19 applies urging forces to three rollers 4. In case of the second embodiment, a plurality of urging members 19 are disposed equidistantly along a circumferential direction.

Similar to the first embodiment, both circumferential ends of each urging member 19 have ends bent outwardly so that the ends 9a are supported by holding projections 13. According to the second embodiment, the number of parts is reduced and the apparatus is made simpler.

(Third Embodiment)

Figure 9:
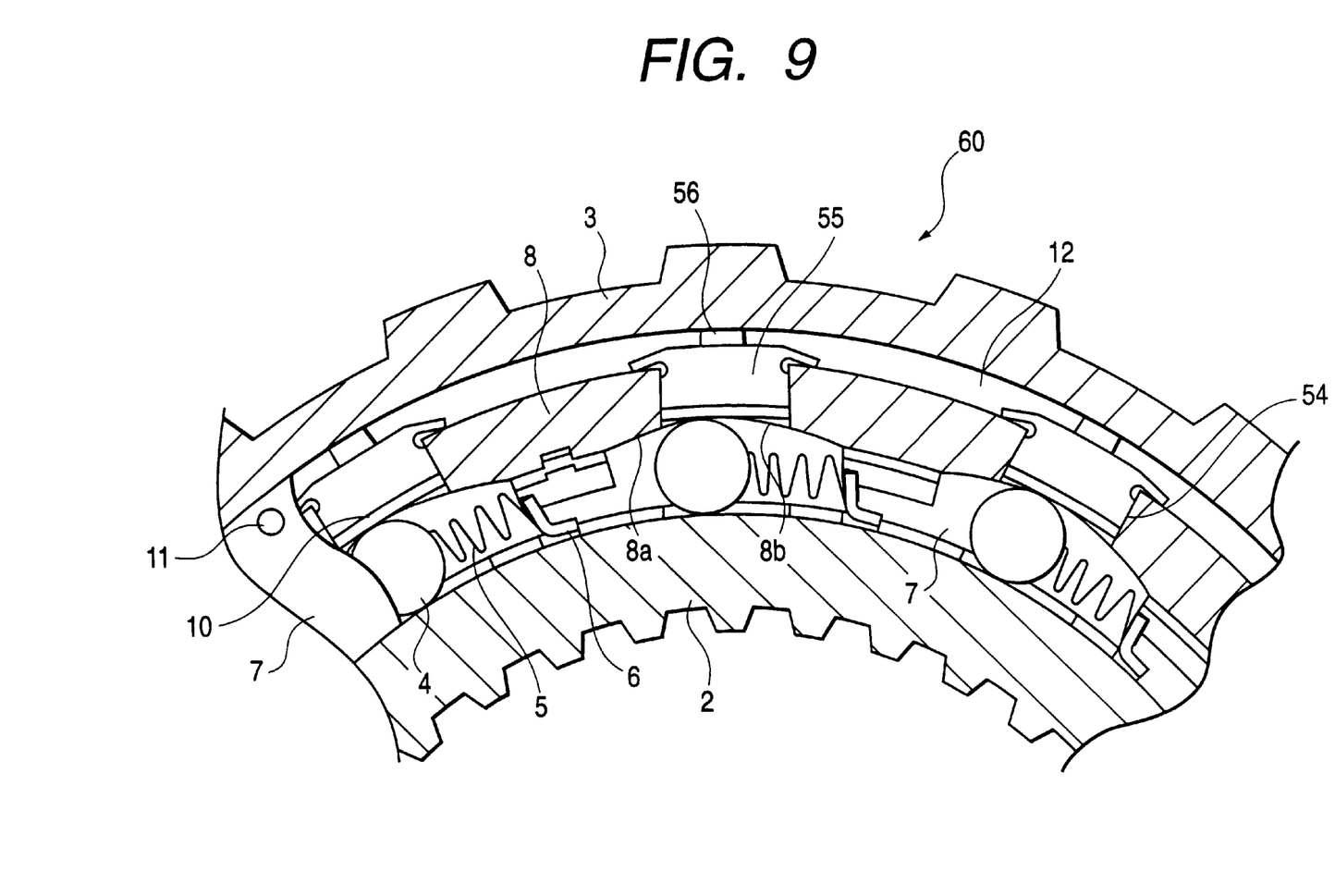
FIG. 9 is a radial sectional view of a one-way clutch according to a third embodiment of the present invention.

FIG. 9 is a partial radial sectional view of a one-way clutch 60 according to a third embodiment of the present invention. Since fundamental construction and operation are the same as those of the first embodiment, explanation thereof will be omitted.

In the third embodiment, as each urging member, in place of a plate-shaped member, an urging piece is used. Similar to the first and second embodiments, one oil passage is provided. Further, each urging piece is associated with one roller 4.

Figure 10:
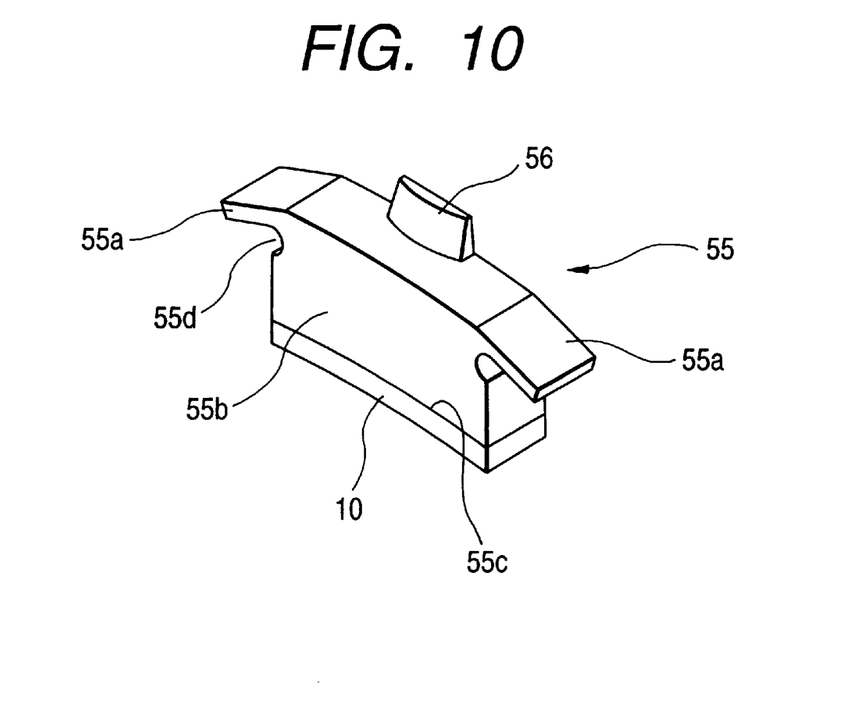
FIG. 10 is a perspective view of an urging piece used in the third embodiment.

A cam portion 8 of an outer race 3 is provided with a plurality of through holes 54 extending radially and disposed equidistantly along a circumferential direction, and the urging pieces 55 are fitted into the corresponding through holes 54. As shown in FIG. 10, each urging piece 55 has a substantially rectangular body 55b provided at its lower surface with a bottom portion 55c to which a friction material 10 is adhered.

The body 55b of each of the plurality of urging pieces 55 has a pair of arm portions 55a protruding from an upper part of the body outwardly and downwardly in opposite directions. Below the arm portions 55a, recessed portions 55d are formed in side surfaces of the body 55b. The urging piece 55 is formed from material having predetermined elasticity, such as resin.

In the third embodiment, the oil pressure is applied through oil pressure introduction ports 11 of the outer race 3, the oil pressure passes in the oil passages 12 to urge the urging pieces 55 to abut the urging pieces against the rollers 4 via the friction materials 10, thereby locking-up the one-way clutch 60. Incidentally, FIG. 9 shows the urging pieces 55 in a non-lock-up condition.

When the oil pressure is released to release the lock-up, each urging piece 55 is returned to its original position mainly due to elastic forces or spring forces of the arm portions 55a. A stopper member 56 is integrally formed (or formed as a discrete part) on an upper surface (opposite to the surface on which the friction material 10 is adhered) of the urging piece 55. Due to the presence of the stopper member 56, the urging piece 55 is maintained in an elevated position between an upper wall of the oil passage 12 of the outer race 3 and the cam portion 8 holding the arm portions 55a.

(Fourth Embodiment)

Figure 11:
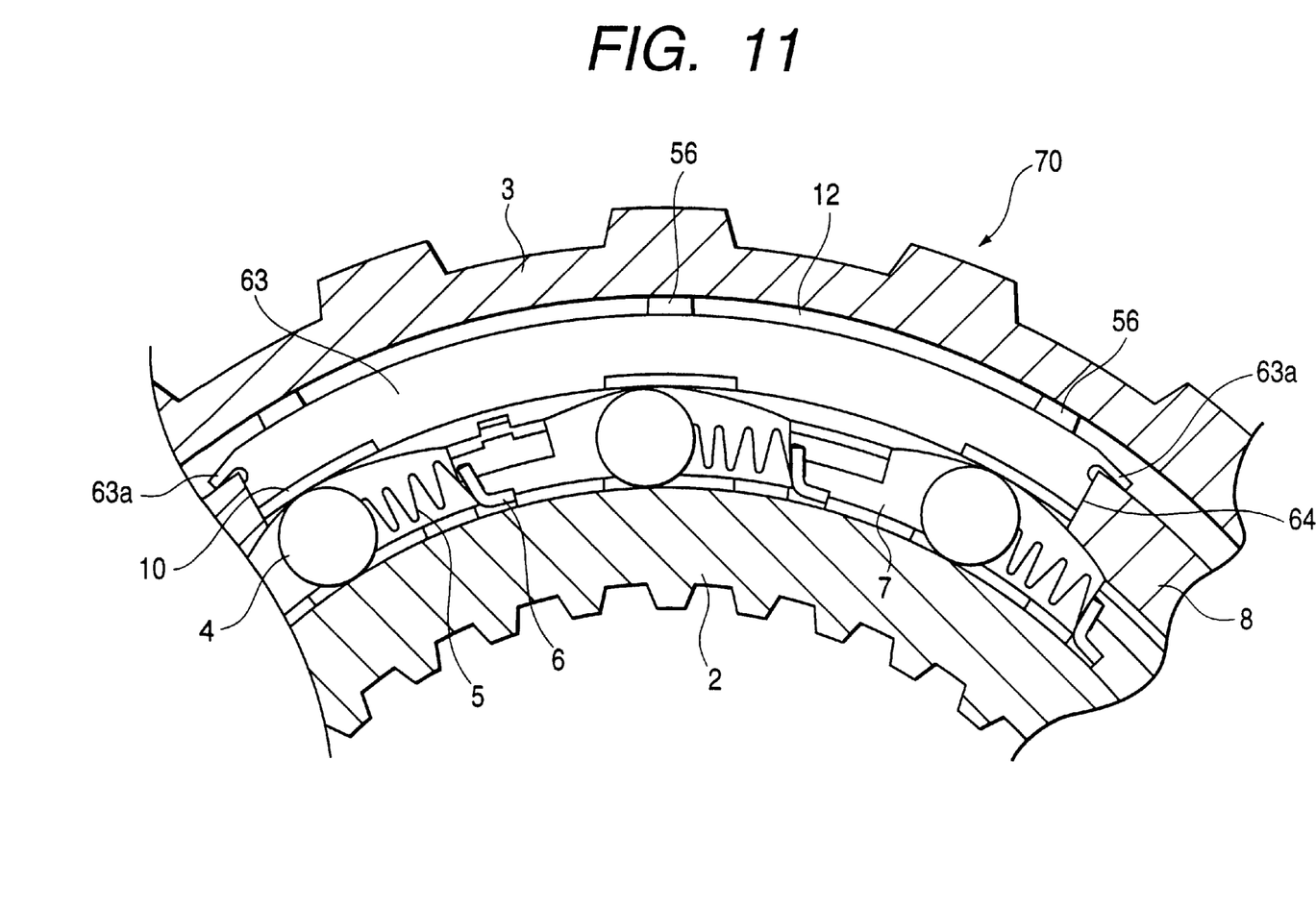
FIG. 11 is a radial sectional view of a one-way clutch according to a fourth embodiment of the present invention.

FIG. 11 is a radial sectional view of a one-way clutch 70 according to a fourth embodiment of the present invention.

In the fourth embodiment, the design is an example of one elongated urging piece 63 a straddling plurality of rollers, the illustrative design being such that one urging piece applies an urging force to three rollers 4.

Arm portions 63a are provided on both circumferential ends of each urging piece 63. When the urging piece is operated by oil pressure, the arm portions are supported by portions of the cam portion 8 adjacent to a through hole 64 formed in the cam portion 8. According to the fourth embodiment, the number of parts is reduced and the apparatus is made simpler. A stopper member 56 is integrally formed (or formed as a discrete part) on an upper surface (opposite to the surface on which the friction material 10 is adhered) of the urging piece 63. Due to the presence of the stopper member 56, the urging piece 63 is maintained in an elevated position between an upper wall of the oil passage 12 of the outer race 3 and the cam portion 8 holding the arm portions 63a.

(Fifth Embodiment)

Figure 12:
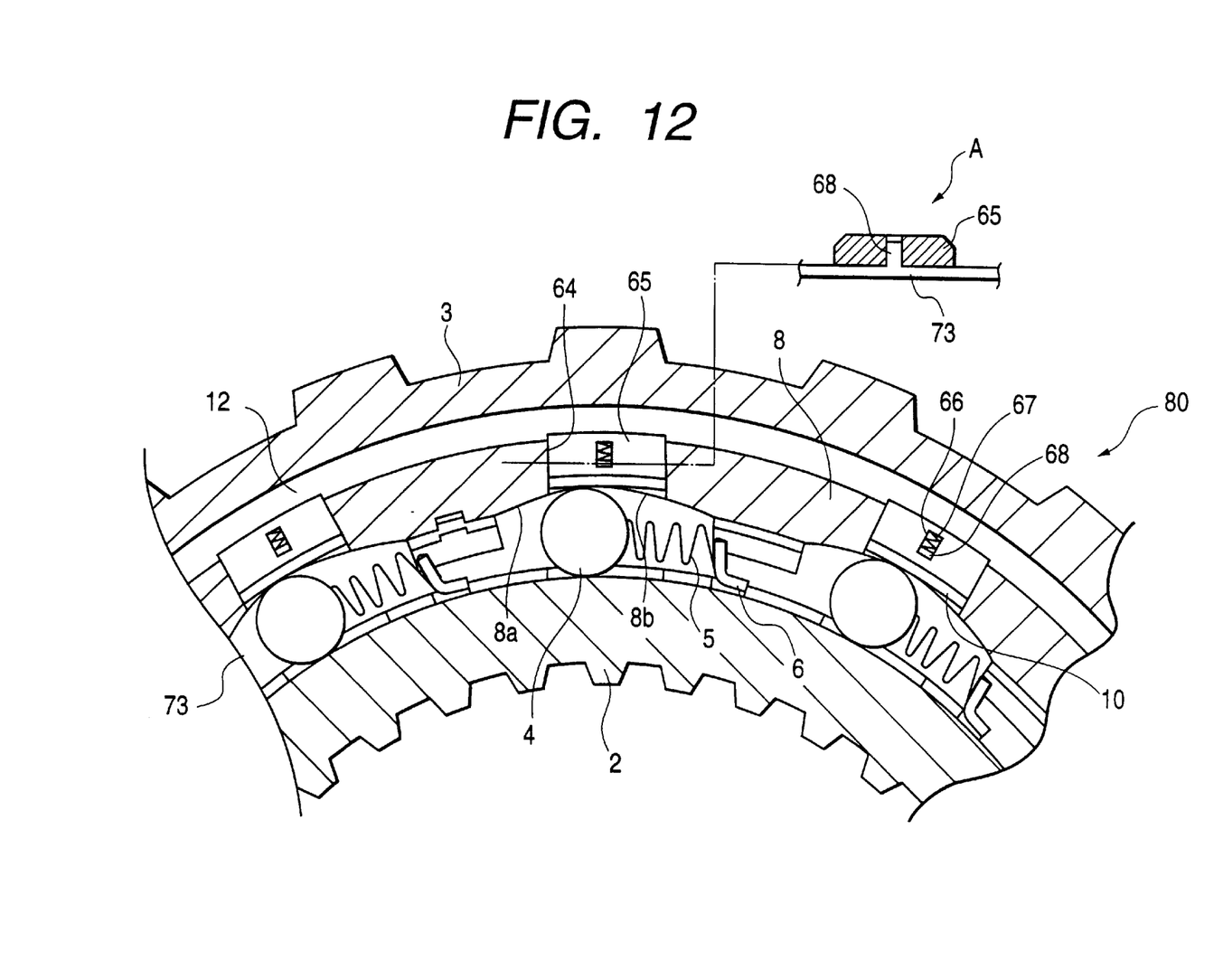
FIG. 12 is a radial sectional view of a one-way clutch according to a fifth embodiment of the present invention.

FIG. 12 is a partial radial sectional view of a one-way clutch 80 according to a fifth embodiment of the present invention. Since fundamental construction and operation are the same as those of the first embodiment, explanation thereof will be omitted.

In the fifth embodiment, similar to the fourth embodiment, as each urging member, in place of a plate-shaped member, a block-shaped urging piece 65 is used. Each urging piece 65 is associated with one roller 4.

A cam portion 8 of an outer race 3 is provided with a plurality of through holes 64 extending radially and disposed equidistantly along a circumferential direction, and the urging pieces 65 are fitted into the corresponding through holes 64. A friction material 10 is adhered to a lower surface of each urging piece 65.

Each of urging pieces 65 has a rectangular window portion 66 extending axially through the urging piece. A spring 67 is fitted into each window portion 66. Further, a projection 68 integrally formed with a side plate 73 and protruding axially is fitted into each window portion 66. The spring 67 is disposed between the projection 68 and an inner surface of the window portion 66. "A" in FIG. 12 is a partial sectional view showing a condition that the urging piece 65 is held by the projection 68 of the side plate 73.

According to the fifth embodiment having the above-mentioned arrangement, in a condition that the oil pressure is not applied, each urging piece 65 is in a position shown in FIG. 12. In this case, since each spring 67 applies the biasing force to the projection 68 within the window portion 66, the urging piece 65 is biased outwardly (radially upwardly) by the projection 68. Accordingly, the urging piece 65 is held at a position where the urging piece does not urge the corresponding roller 4.

When the oil pressure is supplied to the oil introduction port 11 (not shown) and the oil passage 12, due to the hydraulic force, the urging piece 65 is shifted downwardly in opposition to the biasing force of the spring 67. Accordingly, the lower surface of the urging piece 65 abuts against the periphery of the roller 4, thereby urging the roller 4 against the outer peripheral surface of the inner race 2.

When the oil pressure is released, as mentioned above, the urging piece 65 is shifted upwardly by the biasing force of the spring 67 to be spaced apart from the peripheral surface of the roller 4.

(Sixth Embodiment)

Figure 13:
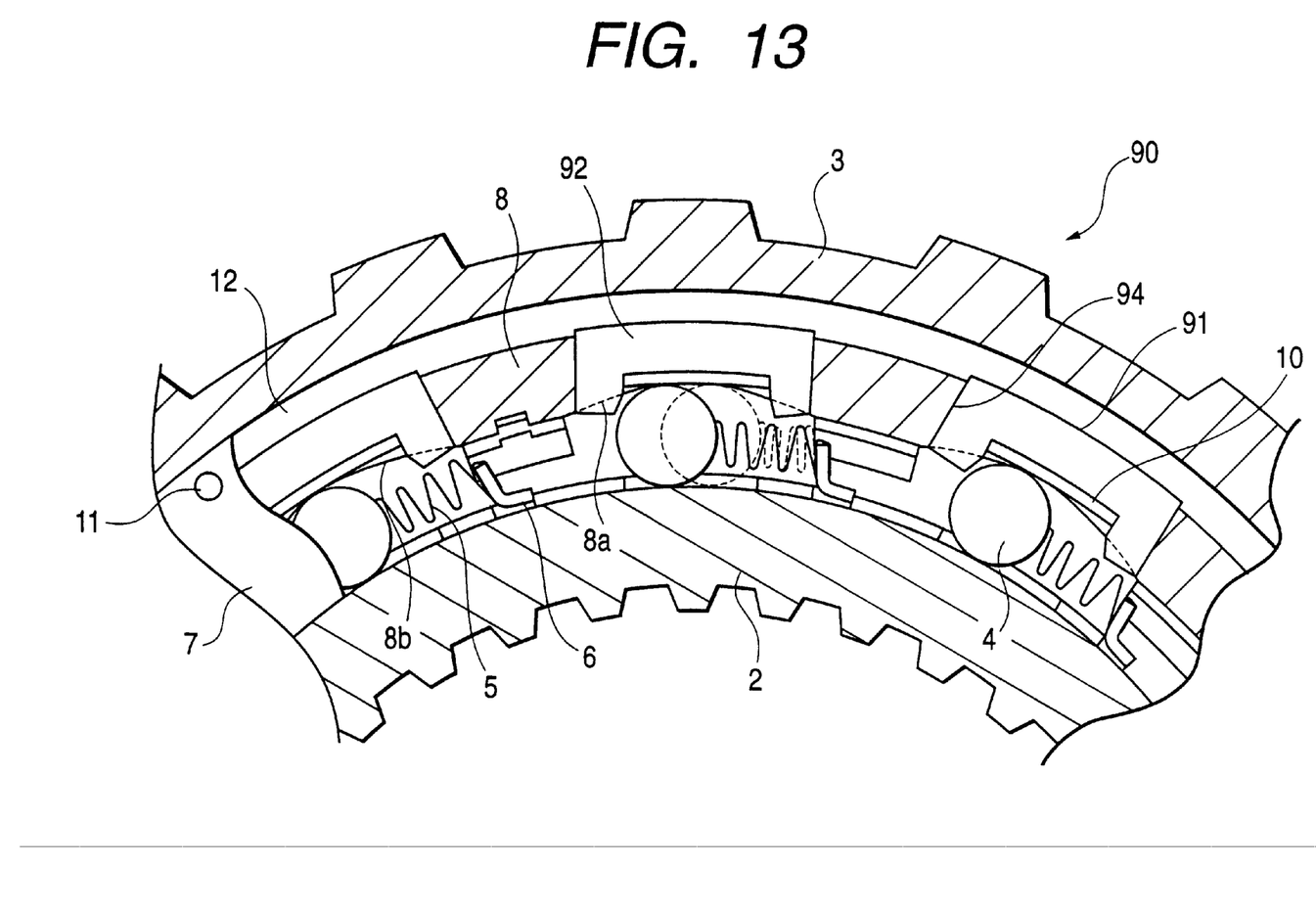
FIG. 13 is a radial sectional view of a one-way clutch according to a sixth embodiment of the present invention.
Figure 14:
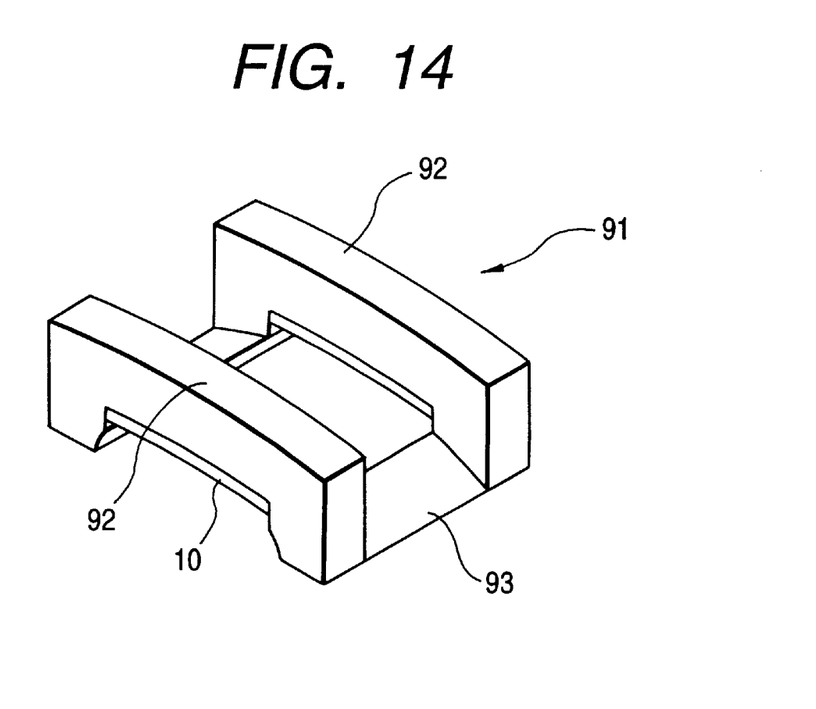
FIG. 14 is a perspective view of an urging piece used in the sixth embodiment.

FIG. 13 is a partial radial sectional view of a one-way clutch 90 according to a sixth embodiment of the present invention. Since fundamental construction and operation are the same as those of the first embodiment, explanation thereof will be omitted. FIG. 14 is a perspective view of an urging member 91 used in this sixth embodiment.

In the sixth embodiment, as each urging member, in place of a plate-shaped member, an urging piece 91 is used. Each urging piece 91 is associated with one roller 4.

A cam portion 8 of an outer race 3 is provided with a plurality of through holes 94 extending radially and disposed equidistantly along a circumferential direction, and the urging pieces 91 are fitted into the corresponding through holes 94. As shown in FIG. 14, each urging piece 91 is integrally formed by two urging portions 92 spaced apart from each other with a predetermined interval, and a bridge portion 93 for interconnecting ends of the urging portions 92, and friction materials 10 are adhered to lower surfaces of the urging portions 92. Incidentally, the urging portions 92 and the bridge portion 93 may be formed as discrete members.

Unlike in above-mentioned embodiments, the urging piece according to this embodiment is not formed by an elastic member such as a spring. The reason is that, when the oil pressure is released, an upper surface of the bridge portion 93 abuts against a cam surface of an outer race 3, and, when the oil pressure is applied, the bridge portion abuts against the roller 4 to prevent further movement of the roller. When the oil pressure is not applied, the urging piece 91 may be in a free condition.

In the sixth embodiment, when the oil pressure is applied through the oil introduction port 11 of the outer race 3, the oil passes through the oil passage 12 to urge the urging piece 91 to abut the urging piece against the roller with the interposition of the friction material 10, thereby locking-up the one-way clutch 90. Incidentally, FIG. 13 shows the urging piece 91 in a non-lock-up condition.

When the oil pressure is released to release the lock-up, the urging members 91 become free thereby releasing the urging against the rollers 4.

(Seventh Embodiment)

Figure 15:
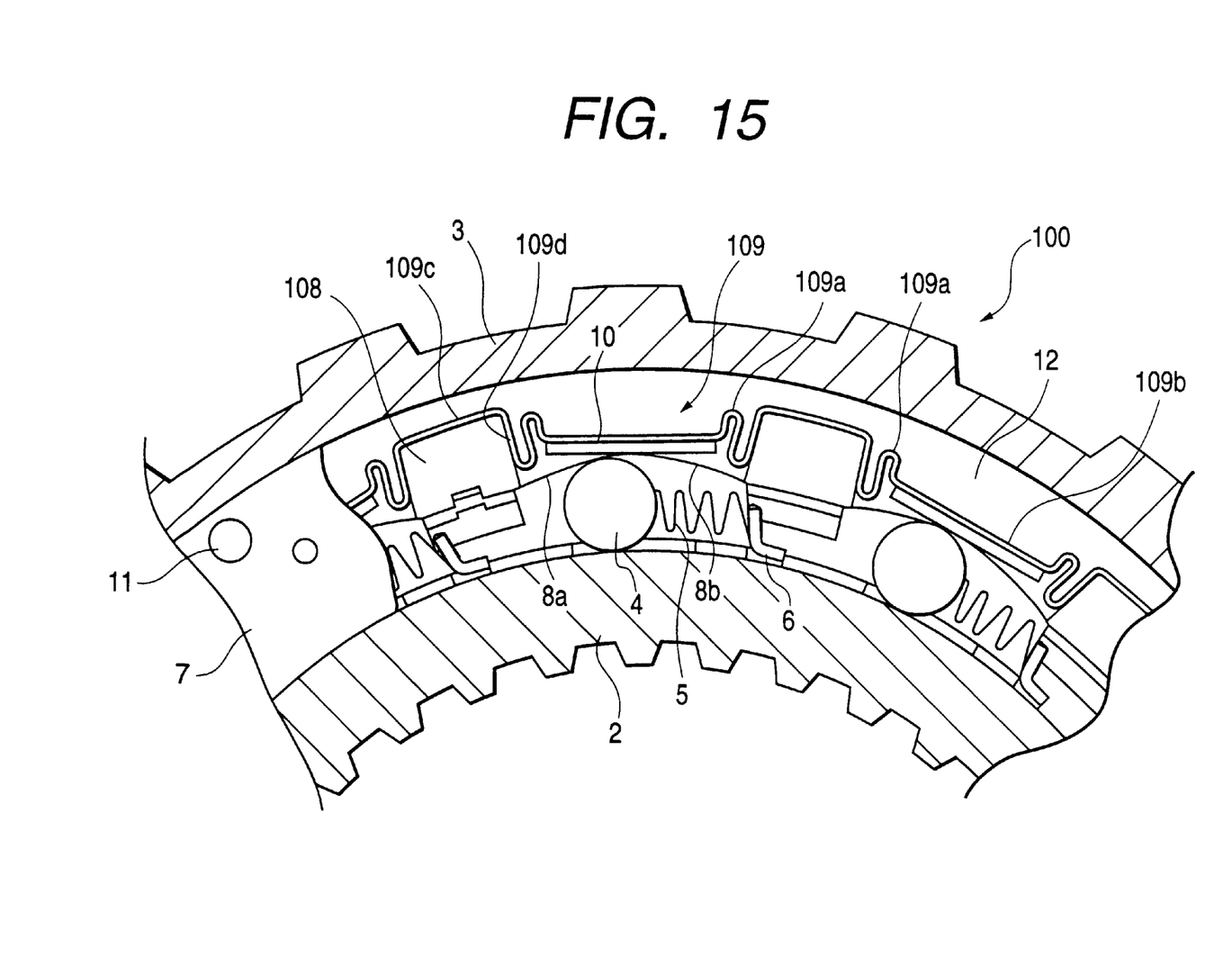
FIG. 15 is a radial sectional view of a one-way clutch according to a seventh embodiment of the present invention.
Figure 16:
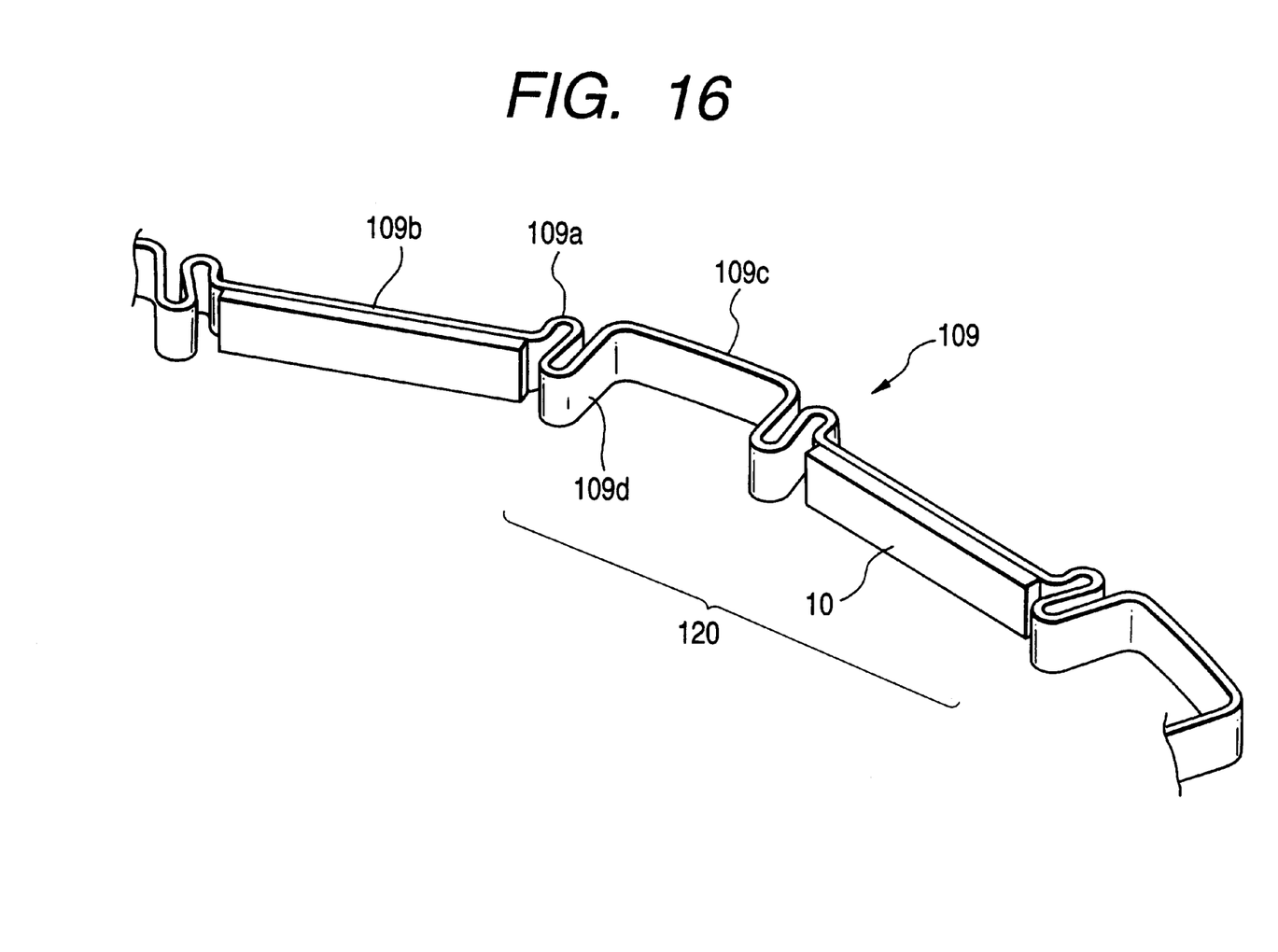
FIG. 16 is a perspective view of an urging member used in the seventh embodiment.

FIG. 15 is a radial sectional view of a one-way clutch 100 according to a seventh embodiment of the present invention. Since fundamental construction and operation are the same as those of the first embodiment, explanation thereof will be omitted. Further, FIG. 16 is a perspective view of an urging member used in this embodiment.

In the seventh embodiment, an elongated plate-shaped member 109 is used as an urging member. FIG. 16 is a partial perspective view showing an urging member 109 in detail. The urging member 109 is formed from an elongated belt-shaped material and has bent portions 109a bent outwardly and inwardly, upper flat portions 109c contiguous to respective bent portions 109a, and lower flat portions 109b connected to the upper flat portions 109c via adjacent bent portions 109a. When it is considered that one bent portion 109a, one upper flat portion 109c and one lower flat portion 109b constitute one unit, a plurality of units are contiguous to each other to form an annular urging member 109. It should be understood that the numbers of the bent portions 109a and the flat portions 109b, 109c can freely be selected.

The urging member 109 having the above-mentioned construction is assembled in the one-way clutch 100 in a condition that the lower flat portions 109b to which the friction materials 10 are adhered are opposed to the rollers 4 and the upper flat portions 109c are held by holding portions 108 provided on the cam portion of the outer race 3. In this case, since side surfaces 109d of the bent portions 109a adjacent to each upper flat portion 109c pinch both ends of the corresponding holding portion 108, the urging member 109 is positively held by the holding portions 108.

In the seventh embodiment, when the oil pressure is applied through the oil introduction ports 11 of the outer race 3, the oil passes the oil passages 12 to urge the lower flat portions 109b of the urging members 109, with the result that the friction materials 10 abut against the rollers 4, thereby locking-up the one-way clutch 100. Incidentally, FIG. 15 shows the urging member 109 in a non-lock-up condition.

When the oil pressure is released to release the lock-up, the urging members 109 are returned to their original positions by elasticity of the bent portions 109a, thereby releasing the urging against the rollers 4.

(Eighth Embodiment)

Figure 17:
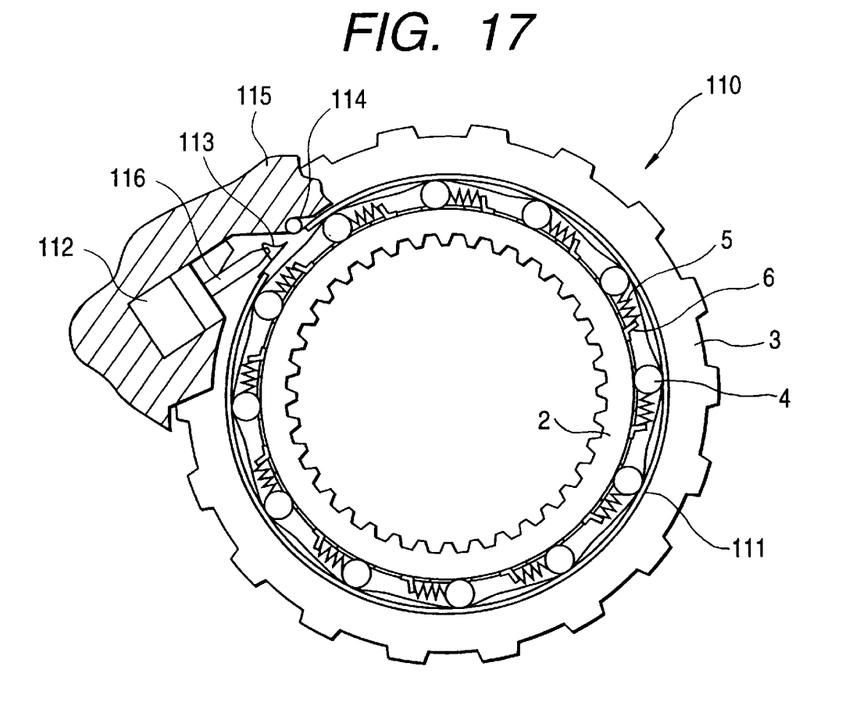
FIG. 17 is a radial sectional view of a one-way clutch according to an eighth embodiment of the present invention.

FIG. 17 is an axial sectional view of a one-way clutch 110 according to an eighth embodiment of the present invention.

In the eighth embodiment, rollers 4 are urged by an annular band 111 surrounding an inner race 2.

The band 111 has an anchor tab 114 having one end supported by an anchor fixing portion 115, and an apply tab 113 connected to an apply hydraulic unit 112 and adapted to receive oil pressure. When the oil pressure from the hydraulic unit 112 secured to the fixing portion 115 is applied, the apply tab 113 is urged against the anchor tab 114 via a piston 116, and the band urges the rollers 4 against the outer peripheral surface of the inner race 2, thereby locking-up the one-way clutch 110. A friction material for obtaining a required frictional force is adhered to an inner peripheral surface of the band 111 by an adhesive.

In the various embodiments as mentioned above, by urging the rollers 4 by means of the urging members, the rollers 4 are urged between the cam surface and the outer peripheral surface of the inner race, thereby locking-up the one-way clutch. Accordingly, even when the inner race is rotated in either one direction or the other direction, the lock-up can be achieved.

Further, in the embodiments of the present invention, while an example that the outer race is not driven and the inner race is driven was explained, the inner race may be non-driven and the outer race may be driven. Also, both the outer and inner races may be driven.

Furthermore, although it was described for all of the embodiments that the urging members or the urging pieces may be provided at at least one side of the rollers in the axial direction, it is preferable that they are provided at both sides of the rollers in the axial direction in order to prevent the rollers from being inclined.

The configurations of the oil passages, side plates, and urging members or urging pieces described above can freely be combined, and, thus, it should be noted that the present invention is not limited to the above-mentioned embodiments.

It will be appreciated that the one-way clutch having the lock-up function of the present invention functions both as a one-way clutch and as a lock-up clutch, whereby simplicity of the apparatus, reduction in the number of parts, compactness and reduction in weight can be achieved.

What is claimed is:

1. A one-way clutch having a lock-up function, comprising:

an outer race;

an inner race radially spaced apart from said outer race and disposed within said outer race concentrically for relative rotation;

a cam surface provided on one of an inner peripheral surface of said outer race and an outer peripheral surface of said inner race;

a track surface provided on the other of the outer peripheral surface of said inner race and the inner peripheral surface of said outer race in a confronting relationship to said cam surface;

a plurality of roller members disposed between said outer race and said inner race and adapted to transmit torque between said outer race and said inner race;

springs biasing said roller members in one circumferential direction;

at least one member holding said roller members and said springs at predetermined circumferential intervals; and a control member which acts on at least one of said roller members to effect lock-up control;

wherein said control member controls said one-way clutch to lock up said one-way clutch in two rotational directions by urging said at least one roller member substantially radially of said one-way clutch into frictional engagement with the outer peripheral surface of said inner race or the inner peripheral surface of said outer race, and to lock up said one-way clutch in only one rotational direction by releasing said at least one roller member.

2. A one-way clutch having a lock-up function according to claim 1, wherein said cam surface has a configuration with unevenness along a circumferential direction.

3. A one-way clutch having a lock-up function according to claim 1, wherein said control member is operated by oil pressure.

4. A one-way clutch having a lock-up function according to claim 1, wherein said control member is operated by a mechanical member.

5. A one-way clutch having a lock-up function according to claim 1, wherein said control member comprises an elastic member.

6. A one-way clutch having a lock-up function according to claim 5, wherein said elastic member is a spring or resin.

7. A one-way clutch having a lock-up function according to claim 1, wherein a frictional material is adhered to a surface of said control member facing said at least one roller member.

8. A one-way clutch having a lock-up function according to claim 1, wherein said control member comprises a plate-shaped member.

9. A one-way clutch having a lock-up function according to claim 1, wherein said control member comprises a band-shaped member.

10. A one-way clutch having a lock-up function, comprising:

an outer race;

an inner race radially spaced apart from said outer race and disposed within said outer race concentrically for relative rotation;

a cam surface provided on one of an inner peripheral surface of said outer race and an outer peripheral surface of said inner race;

a track surface provided on the other of the outer peripheral surface of said inner race and the inner peripheral surface of said outer race in a confronting relationship to said cam surface;

a plurality of roller members disposed between said outer race and said inner race and adapted to transmit torque between said outer race and said inner race;

springs biasing said roller members in one circumferential direction;

at least one member holding said roller members and said springs at predetermined circumferential intervals; and a control member which acts on at least one of said roller members to effect lock-up control;

wherein said control member is movable substantially radially of said one-way clutch to lock up said one-way clutch in two rotational directions by urging said at least one roller member into frictional engagement with the outer peripheral surface of said inner race or the inner peripheral surface of said outer race, and to lock up said one-way clutch in only one rotational direction by releasing said at least one roller member.

11. A one-way clutch having a lock-up function according to claim 10, wherein said cam surface has a configuration with unevenness along a circumferential direction.

12. A one-way clutch having a lock-up function according to claim 10, wherein said control member is operated by oil pressure.

13. A one-way clutch having a lock-up function according to claim 10, wherein said control member is operated mechanically.

14. A one-way clutch having a lock-up function according to claim 10, wherein said control member comprises an elastic member.

15. A one-way clutch having a lock-up function according to claim 14, wherein said elastic member is a spring or resin.

16. A one-way clutch having a lock-up function according to claim 10, wherein a friction material is adhered to a surface of said control member facing said at least one roller member.

17. A one-way clutch having a lock-up function according to claim 10, wherein said control member comprises a plate-shaped member.

18. A one-way clutch having a lock-up function according to claim 10, wherein said control member comprises a band-shaped member.

* * * * *